United States Patent [19]

Fort

[11] Patent Number: 4,498,601
[45] Date of Patent: Feb. 12, 1985

[54] LIDS FOR PRESSURE VESSELS

[76] Inventor: Edward S. Fort, Ashcroft, Crow Trees Brow, Chatburn, Clitheroe, Lancashire, England

[21] Appl. No.: 377,590

[22] Filed: May 12, 1982

[30] Foreign Application Priority Data

May 13, 1981 [GB] United Kingdom ............... 8114559

[51] Int. Cl.³ ............................................. B65D 51/18
[52] U.S. Cl. ..................................... 220/256; 220/355
[58] Field of Search ......................... 220/256, 259, 355

[56] References Cited

U.S. PATENT DOCUMENTS 4,111,330 9/1978 Jordan ................................. 220/306

FOREIGN PATENT DOCUMENTS 1184271 12/1964 Fed. Rep. of Germany ...... 220/256
476980 12/1937 United Kingdom ................ 220/358

Primary Examiner—George T. Hall
Attorney, Agent, or Firm—Gipple & Hale

[57] ABSTRACT

A lid for a pressure vessel comprising an inner skin having a seal groove formed in the periphery thereof by pressing, and a reinforcing member which is contiguous with at least a portion of the inner skin. In one embodiment, the reinforcing member comprises an L-shaped annular ring which backs up the seal groove region of the inner skin. In another embodiment the reinforcing member completely covers the inner skin. In this embodiment the central section of the inner and outer skins are part spherical and are contiguous with one another. An air gap exists radially inwardly of the seal groove between the two skins. In another embodiment the inner and outer skins are spaced apart over their central section and on insulating may be disposed in the space so formed.

17 Claims, 4 Drawing Figures

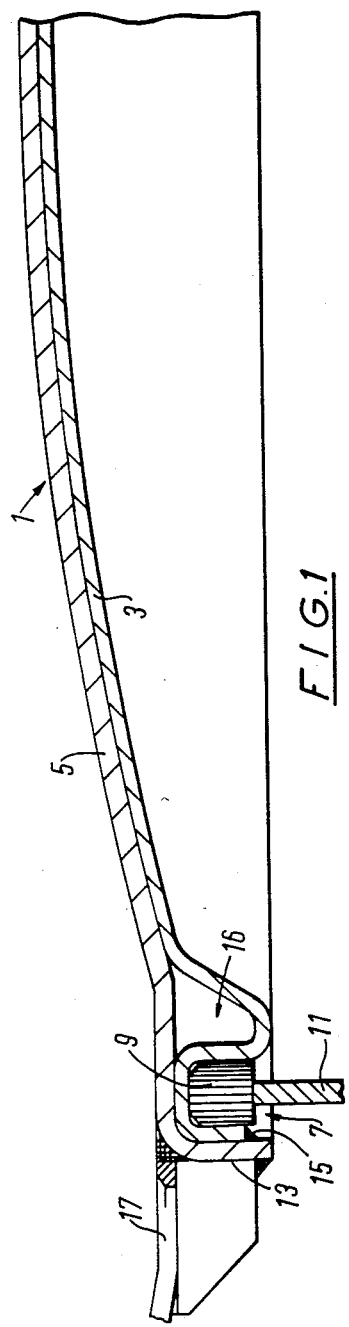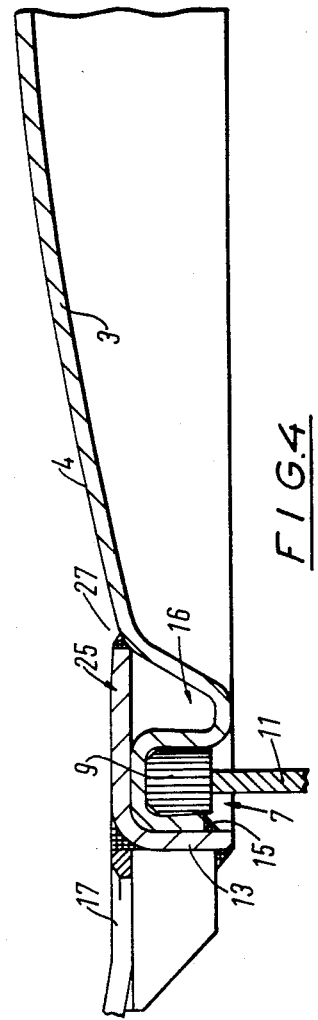

LIDS FOR PRESSURE VESSELS

The present invention relates to a lid for a pressure vessel.

Pressure vessels and tanks in general are provided with man lids which typically are circular and are pivotally attached to a neck ring which is attached to the vessel. Swing bolt assemblies secured to the neck ring at pivot brackets engage with lugs secured to the lid so as to clamp the lid in sealing engagement with the neck ring. One known man lid is manufactured as a fabrication in which an annular ring is welded around the circumference of a circular domed plate. Swing bolt lugs are welded onto this annular ring and a groove is machined in the annular ring to accommodate a seal. Seal retention is achieved by machining the mouth of the groove narrower than the base of the groove. The domed plate is necessary of heavy construction in order to withstand the pressures encountered in use and the weld securing it to the annular ring must be of high quality since this too is subjected to the pressure within the vessel. A lid fabricated in this manner is both expensive and time consuming to produce.

Another known man-lid is manufactured as a casting. However, this too is expensive to produce.

It is an aim of the present invention to provide a lid which overcomes the aforementioned difficulties and which as a result can be produced more quickly and economically.

According to one aspect of the present invention there is provided a lid for a pressure vessel comprising a first skin having around the circumference thereof a seal groove formed by pressing, and a reinforcing member which is contiguous with at least a portion of the first skin.

Preferably the seal groove is generally U-shaped, the sides of which groove converge toward the mouth thereof. In one embodiment the first skin comprises a convex or part spherical central portion surrounded by the U-shaped seal groove. In a preferred embodiment the reinforcing member comprises a convex or part spherical central section bounded by a peripheral flange extending generally parallel to the central axis of the lid, and in this form constitutes an outer skin with a concave surface and within which the first or inner pressed skin is received. The inner skin is conveniently pressed from a thinner guage material than that of the outer skin which is also of pressed construction. In the preferred embodiment the central part spherical portion of the inner and outer skins are contiguous and may be in abutting contact with one another. An outer peripheral edge region of the outer reinforcing member is in abutting relation with at least a portion of the exterior at the seal groove of the inner skin. An air gap exists inbetween the two skins in a region just radially inwardly from the seal groove. Thus according to a preferred embodiment of the invention there is provided a lid for a pressure vessel comprising an inner skin having around the circumference thereof a seal groove formed by pressing and a reinforcing outer skin continuous with the inner skin.

In a preferred embodiment the radially outer most edge of the inner skin is welded to the outer skin.

Preferably lugs to which the swing bolts attach are welded to the circumference of the outer skin. Alternatively the lugs may be formed integrally with the outer skin.

The construction according to the invention has the advantage that the inner skin is in one piece with the advantage that no welded connection occurs radially inwardly of the seal. This serves to avoid the need for thorough checking of the weld for leaks. Furthermore contamination of certain payloads may occur when the weld is within the seal because of the difficulty of polishing the welded area. Also the required strength of lid can be achieved by provision of the outer skin which is thicker than the inner skin and yet because of its simple shape can be of pressed construction. Further, because the inner skin is not required to take all the pressure loading, it can be of a thinner construction such that the complicated shape required to accommodate the seal groove can be readily achieved by pressing.

The required strength is achieved by the combination of the inner skin and the reinforcing member. The shape of the inner pressed skin in combination with the outer reinforcing has a higher moment of inertia than the shape of known lids of equivalent material thickness and hence the required strength is achieved with less material.

In one the inner skin is only contiguous with the outer reinforcing member in the region of the seal groove, the part spherical central section of the inner skin and the reinforcing member being spaced apart and lying approximately parallel to one another. An insulating material may be disposed within the gap so formed.

In another embodiment the reinforcing member comprises a generally L-shaped ring which may be of pressed, rolled or cast construction. The L-shaped ring is disposed outwardly of the seal groove so as to back up and serve to reinforce the lid in the region of the seal groove. The ring is welded to the inner skin at its inner and outer extremities. The inner periphery of the reinforcing groove extends inwardly beyond the seal groove and contacts the part spherical central section of the inner skin at which point it is welded. An air gap exists between the reinforcing ring and the inner skin radially inwardly of the seal groove and this gives rise to the higher moment of inertia compared to the known designs.

The present invention will now be described further, by way of example only, with reference to the accompanying drawings, in which:

FIG. 1 is a view in section showing a part of the lid of a first embodiment of the invention;

FIG. 4 is a view in section showing a part of the lid of a still further embodiment.

Figure 2:
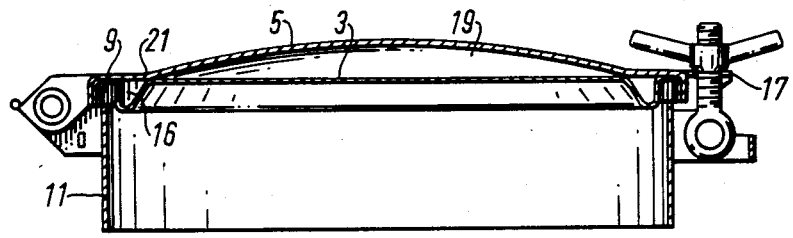
FIG. 2 is a section through a second embodiment of a lid in accordance with the invention.

Referring to the drawing of FIG. 1 there is illustrated approximately one half of a lid 1, in section, for a vessel. The lid has an inner skin 3 and an outer skin 5 both of which are domed or part spherical. The inner skin 3 is of thinner material than the outer skin and is of pressed construction having a seal groove 7 at the outer circumference of the lid. The seal groove 7 accommodates an annular seal 9 which, in use, engages with the edge of a neck ring 11 secured to the vessel.

The seal groove 7 has a tapered cross-section with its mouth being narrower than the base and this serves to retain the seal in position.

The outer skin 5 serves as a reinforcing member and has an outer rim or flange 13 which is disposed substantially parallel to the axis of the lid, which lid is generally circular. The outer skin is also formed by pressing. The inner skin 3 is arranged to fit within the outer skin so that the convex outer surface of the inner skin 3 is contiguous with the concave inner surface of the outer skin 5. The outer radial face of the seal groove is contiguous with the inner radial face of the outer skin rim 13. A cosmetic weld 15 is made between the edge of the seal groove 7 and the rim 13 to positively locate the two components. In this manner the complicated shape of the inner skin can be easily pressed from sheet material, and the required strength of the lid is achieved by the combination of the inner skin and the reinforcing outer skin which can also be pressed from sheet material. Typically the lid is made from stainless steel, but for less stringent applications, aluminium or mild steel can be used.

An air gap 16 exists between the inner and outer skins 3,5 and this gives the lid a greater moment of inertia than an equivalent thickness of known design of lid. Thus, the required strength is achieved with less material.

The lid is provided with lugs spaced around the circumference of the lid and with which swing bolts engage to locate the lid in position. In the illustrated embodiment one lug 17 is shown and this is welded to the rim 13 of the outer skin 5. In an alternative construction, not illustrated, the lugs may be an integral part of the outer skin 5. The lid may be pivotally secured to the neck ring 11.

Referring now to FIG. 2 there is illustrated in section, one half of a second embodiment of the invention. In this embodiment the same reference numerals have been used to identify corresponding parts.

The inner skin 5 is spaced from the inner concave surface of the outer skin 3 so as to provide an air space 19 which serves to afford insulating properties to the lid. The central portion 23 of the inner skin is flat in this embodiment, but as in the case of FIG. 1 the inner skin 3 contacts the outer skin 5 at 21 to generate an air gap 16 radially inwardly of the seal groove and thus lid also has an improved moment of inertia since it corresponds in shape, in the region of the seal groove, with the embodiment of FIG. 1. An insulating material, such as a foam plastics, glass fibre or asbestos, may be placed between the inner and outer skins to further improve the insulating properties.

Figure 3:
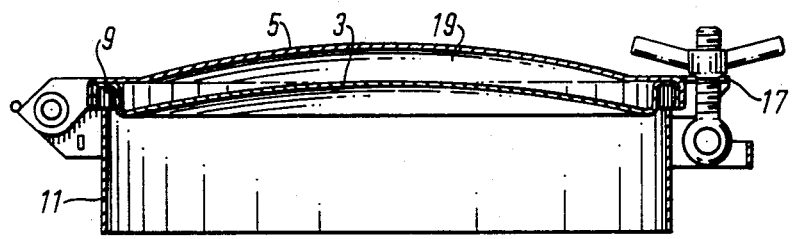
FIG. 3 is a similar view to FIG. 2 showing a further embodiment of the invention.

FIG. 3 shows a further variation of an insulated man lid. In this version both the inner and outer skins 3,5 have a central part spherical portion, but these are spaced apart from one another, and lie approximately parallel to one another. In this embodiment the inner skin does not contact the outer skin except over an L-shaped annulus surrounding the seal groove.

FIG. 4 shows a part of a lid in section and is similar to the embodiment of FIG. 1, and like reference numerals have been used to identify corresponding parts. This embodiment employs a one piece inner skin 3 of pressed construction having a seal groove 7 and a part spherical central portion 4. However, the outer skin 5 of the FIG. 1 embodiment which surrounded externally the inner skin 3 has been replaced by a reinforcing member which is annular and has a substantially L-shaped cross-section. The L-shaped reinforcing ring 25 is in abutting contact with a part of the exterior of the seal groove 7—over an L-shaped annular area, and contacts the inner skin at a point 27 radially inwardly of the seal groove and is welded at this point with a cosmetic weld 27. A further cosmetic weld is made between the free edge of the seal groove and the free radially outer edge of the L-shaped reinforcing ring 25. An air gap 16 exists between the inner skin 3 and reinforcing ring 25 radially inwardly of the seal groove and this serves to give the lid its required strength.

I claim:

1. A man-lid for a container tank comprising a one piece inner skin having an inturned flange which defines in part an annular seal groove formed in the inner skin by pressing and a reinforcing member disposed externally of the inner skin and having a part which is L-shaped in cross-section and which backs-up the inner skin in the region of the seal groove, an inturned peripheral flange of said L-shaped part being contigous with the inturned flange of the inner skin and an external edge of said peripheral flange being welded to the inturned flange of the inner skin.

2. A lid according to claim 1, wherein the reinforcing member comprises a ring which is contiguous with the seal groove over an L-shaped annular area.

3. A lid according to claim 2, wherein the ring is welded to the inner skin at the radially inner and radially outer edge region of the ring.

4. A lid according to claim 1, wherein the inner skin comprises a part spherical central portion which is surrounded by the seal groove.

5. A lid according to claim 1, wherein an annular air gap is formed radially inwardly of the seal groove between the inner skin and the reinforcing member.

6. A lid according to claim 1, wherein the reinforcing member completely covers the inner skin.

7. A lid according to claim 6, wherein the reinforcing member comprises a central spherical part and a flange which forms a peripheral edge region of the reinforcing member and in which the flange is disposed substantially parallel to the axis of symmetry of the lid.

8. A lid according to claim 7, wherein the inner skin is welded to the flange of the reinforcing member radially outwardly of the seal groove.

9. A lid according to one of claims 6, 7 and 8, wherein the central portion of the reinforcing member is spaced from the central portion of the inner skin to provide an air space.

10. A lid according to claim 9, wherein an insulating material is disposed in the air space.

11. A lid according to claim 10, wherein the insulating material is one of foam plastics, glass fibre, mineral fibre and asbestos.

12. A lid according to claim 1, wherein the reinforcing member is of pressed construction.

13. A lid for a pressure vessel comprising a one piece inner skin of pressed construction, a seal groove formed by pressing and extending around the circumference of the inner skin, and a one piece outer skin surrounding the inner skin and contiguous therewith.

14. A lid according to claim 13, wherein the inner skin is welded to the outer skin radially outwardly of the seal groove.

15. A lid according to claim 13, wherein both the inner and outer skins are formed by pressing and wherein the inner skin is a thinner guage material than the outer skin.

16. A lid according to claim 13, wherein an annular air gap is formed radially inwardly of the seal groove between the inner and outer skins.

17. A lid according to one of claims 1 and 13, wherein the seal groove is U-shaped in cross-section and the opposed side walls converge toward the mouth of the groove.

* * * * *